United States Patent
Fink

(10) Patent No.: US 9,682,670 B2
(45) Date of Patent: Jun. 20, 2017

(54) METHOD FOR TRANSFERRING BATTERIES TO A DISCHARGED STATE, BATTERY MANAGEMENT SYSTEM, INVERTER, SYSTEM FOR GENERATING AN AC VOLTAGE, CHARGING CURRENT SOURCE AND MOTOR VEHICLE

(71) Applicants: Robert Bosch GmbH, Stuttgart (DE); Samsung SDI Co., Ltd., Yongin-si, Gyeonggi-do (KR)

(72) Inventor: Holger Fink, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 534 days.

(21) Appl. No.: 13/968,291

(22) Filed: Aug. 15, 2013

(65) Prior Publication Data
US 2014/0049103 A1 Feb. 20, 2014

(30) Foreign Application Priority Data
Aug. 16, 2012 (DE) .................. 10 2012 214 554

(51) Int. Cl.
B60R 16/033 (2006.01)
B60L 3/04 (2006.01)
B60L 3/00 (2006.01)
B60L 11/18 (2006.01)

(52) U.S. Cl.
CPC .......... *B60R 16/033* (2013.01); *B60L 3/0046* (2013.01); *B60L 3/0069* (2013.01); *B60L 3/04* (2013.01); *B60L 11/1861* (2013.01); *B60L 2210/30* (2013.01); *B60L 2210/40* (2013.01); *Y02T 10/705* (2013.01); *Y02T 10/7011* (2013.01); *Y02T 10/7044* (2013.01); *Y02T 10/7241* (2013.01)

(58) Field of Classification Search
CPC .... B60R 16/033; B60L 3/0046; B60L 3/0069; B60L 3/04; B60L 2210/30; B60L 2210/40; B60L 11/1861; Y02T 10/7005; Y02T 10/7011; Y02T 10/7044; Y02T 10/705; Y02T 10/7241
USPC .................................................. 307/9.1, 10.1
See application file for complete search history.

(56) References Cited

U.S. PATENT DOCUMENTS

| | | | |
|---|---|---|---|
| 7,560,935 B2* | 7/2009 | Morimoto | B60L 3/0023 324/503 |
| 8,362,754 B2* | 1/2013 | Maebara | H02M 7/53871 307/109 |
| 2005/0237773 A1 | 10/2005 | Sasaki | |

FOREIGN PATENT DOCUMENTS

| | | |
|---|---|---|
| CN | 101025436 A | 8/2007 |
| CN | 102195504 A | 9/2011 |
| WO | 2009011749 A1 | 1/2009 |

* cited by examiner

*Primary Examiner* — Hal Kaplan
(74) *Attorney, Agent, or Firm* — Maginot, Moore & Beck LLP

(57) ABSTRACT

The disclosure relates to a method for transferring batteries to a discharged state, a battery system, an inverter, a system for generating an AC voltage, a charging current source and a motor vehicle. The battery system includes a controllable inverter having parallel current branches and having series-connected power switches that are switchable by external control of the controllable inverter. The battery system further includes a controllable charging and disconnecting device having an interrupted current path and having a charging current source between the battery and the controllable inverter.

8 Claims, 4 Drawing Sheets

METHOD FOR TRANSFERRING BATTERIES TO A DISCHARGED STATE, BATTERY MANAGEMENT SYSTEM, INVERTER, SYSTEM FOR GENERATING AN AC VOLTAGE, CHARGING CURRENT SOURCE AND MOTOR VEHICLE

This application claims priority under 35 U.S.C. §119 to patent application no. DE 10 2012 214 554.0, filed on Aug. 16, 2012 in Germany, the disclosure of which is incorporated herein by reference in its entirety.

BACKGROUND

The present disclosure relates to a method for transferring batteries, for example lithium-ion batteries, to a discharged state. Furthermore, the present disclosure relates to a battery management system for a battery system, an inverter, a system for generating an AC voltage and a charging current source. Furthermore, the present disclosure relates to a motor vehicle.

High-power battery systems for generating AC voltage often comprise a battery based on lithium-ion technology and an inverter having power switches arranged in series on parallel current branches. If the inverter of such a battery system comprises three or more parallel current paths, then the battery system can be embodied directly for supplying a machine suitable for generating torque for the driving of hybrid and electric vehicles. Such battery systems are also designated as traction battery systems or as traction batteries for short.

In order to obtain the power and energy data required in hybrid and electric vehicles and in other AC voltage-based applications, batteries have electrical voltages of up to 450 volts. In traction batteries, for this purpose, individual battery cells are connected in series and in part additionally in parallel.

In high-power batteries, therefore, an electrical voltage limit of 60 volts which is classified as non-critical with regard to contact by humans, is usually exceeded.

The basic circuit diagram of a battery 220 according to the prior art is illustrated in FIG. 1. Alongside the battery cells 140, the battery 220 also has a so-called charging and disconnecting device 130, which in FIG. 1 is arranged between the positive pole 100 of the battery 220 and the positive pole of the battery cells 140. By means of a disconnecting switch 120 and a disconnecting switch 125, a positive pole of the battery cells 140 can be electrically disconnected from the positive pole 100 of the battery 220. By means of the disconnecting switch 120, the positive pole of the battery cells 140 can also be electrically connected to the positive pole 100 of the battery 220 with low impedance, in other words with low resistance. With the disconnecting switch 120 open, the positive pole of the battery cells 140 can also be electrically connected to the positive pole 100 of the battery 220 via a charging current source 110 by means of the disconnecting switch 125. As an optional functional unit, a further disconnecting device 170 is illustrated in FIG. 1, by means of which the battery cells 140, if required, can be disconnected from the negative pole 160 of the battery 220 in a two-pole manner via a second disconnecting switch 150.

FIG. 2 illustrates the basic circuit diagram of an electrical drive system according to the prior art, as is used for example in electric and hybrid vehicles. The electric machine 200, which is embodied as a polyphase machine, for example, is supplied via an inverter or pulse-controlled inverter 210.

In the case of the battery systems currently known it is customary that in the event of a critical state being identified, such as an accident, for example, in which the restraint systems are triggered, the battery is disconnected from the on-board traction power supply system of the vehicle. If possible by virtue of two disconnecting devices being present, two-pole disconnection from the inverter is effected in this case.

WO002009011749A1 discloses a method for inhibiting the propagation of thermal events in an energy storage system having a multiplicity of cells. The method comprises the steps of identifying heat sources in the energy storage system and in the multiplicity of cells, detecting the presence of specific predefined states of the energy storage system, and performing a previously defined action if one of the previously defined states has been detected.

SUMMARY

The disclosure presents a method for discharging a battery which a battery system comprises. In this case, the battery system furthermore comprises a controllable inverter having parallel current branches having series-connected power switches that are switchable by external control of the inverter, a controllable charging and disconnecting device having an interrupted current path having a charging current source between battery and inverter.

The presented method is characterized by the following steps:
- measuring an insulation resistance value of the battery system;
- ascertaining that the measured insulation resistance value does not fall below a minimum resistance value;
- succeeding the ascertaining in time, controlling the inverter for switching on the power switches in at least one of the parallel current branches, such that the power switches in the at least one current branch are switched on simultaneously; and
- succeeding the controlling of the inverter in time, controlling the charging and disconnecting device for closing the electric circuit by closing the current path.

If all the series-connected power switches in at least one branch of the inverter are switched on, then it is possible, via the charging current source, for energy of the battery to be reduced in a controlled manner without power at the output of the inverter. Hazards that can proceed from the battery system or the battery after an accident with a time shift are minimized further as a result.

Furthermore, the disclosure presents a battery management system for a battery system, wherein the battery system is designed for generating an AC voltage by means of a battery which the battery system comprises, and by means of a controllable inverter likewise comprised thereby and having parallel current branches having in each case series-connected power switches that are switchable by external control of the inverter. In this case, the battery system comprises a charging and disconnecting device having a current path having a charging current source between battery and inverter, and the battery management system is designed to control the inverter.

The battery management system is characterized in that the battery management system is designed to control the inverter such that the power switches in at least one of the parallel current branches are switched on simultaneously.

If the charging and disconnecting device is controllable and the current path is closable and interruptible by means of control, then in one embodiment the battery management system can be designed to close the current path by controlling the charging and disconnecting device and thus to close an electric circuit when power switches in at least one of the parallel current branches are switched on simultaneously.

By closing the electric circuit by means of the current path in the charging and disconnecting device, this makes it possible to safely initiate the reduction of the battery energy.

If the battery system comprises a controllable further closing and disconnecting device having another current path between battery system and inverter that is closable and interruptible by means of control, then in one development of the embodiment the battery management system can be designed to close the other current path by controlling the further closing and disconnecting device before closing the current path when power switches in at least one of the parallel current branches are switched on simultaneously.

Closing the other electric circuit prepares for safely initiating the reduction of the battery energy by closing the electric circuit by means of the current path in the charging and disconnecting device.

In another embodiment, the battery management system can be designed to interrupt the current path at intervals.

An overloading of the charging current source can thus be avoided.

In one development of the other embodiment, the battery management system can be designed to determine a presence of an imminent overloading of the charging current source in a model-based manner.

An imminent overloading of the charging current source can thus be predicted.

In yet another embodiment, the battery management system is designed to control the inverter such that the respective at least two power switches in all the parallel current branches are switched on simultaneously.

The disclosure furthermore proposes an inverter for a battery system for generating an AC voltage by means of a battery which the battery system comprises. The inverter comprises at least parallel current branches having series-connected power switches that are switchable by external control of the inverter.

The inverter is characterized in that it is designed for external control that has the effect that power switches in at least one of the parallel current branches are switched on simultaneously.

The disclosure also proposes a system for generating an AC voltage with electrical energy, wherein the system comprises the battery management system according to the disclosure, the inverter according to the disclosure, a battery and a charging and disconnecting device having a current path having a charging current source between battery and inverter.

The disclosure additionally presents a charging current source for the system according to the disclosure, wherein the charging current source is designed to discharge the battery proceeding from a maximum charge state of the battery overloading-safely without interruption.

Finally, the disclosure additionally presents a motor vehicle comprising a machine suitable for generating torque and the system according to the disclosure for supplying the machine suitable for generating torque with electrical energy.

In one embodiment, the method according to the disclosure comprises the following steps, in particular:

controlling the charging and disconnecting device and a further closing and closing and disconnecting device having another current path between battery system and inverter that is closable and interruptible by means of control for the purpose of interrupting on both sides the electric circuit between battery and inverter;

measuring an insulation resistance value of the battery;

ascertaining that the measured insulation resistance of the battery does not fall below a minimum resistance value; and succeeding the controlling of the inverter in time and preceding the controlling of the charging and disconnecting device in time, controlling the further closing and disconnecting device for closing the other current path.

In this or another embodiment of the method, the controlling of the charging and disconnecting device for closing the electric circuit can be succeeded in time by repeated controlling of the charging and disconnecting device for interrupting and subsequently further closing the electric circuit.

In a further embodiment of the method, the method can additionally comprise measuring an insulation resistance value of the inverter and ascertaining that the measured insulation resistance of the inverter does not fall below a further minimum resistance value, before the controlling of the inverter.

The method can furthermore comprise repeatedly measuring a charge state of the battery with the electric circuit closed, ascertaining that the measured charge state falls below a charge state limit, and further controlling of the charging and disconnecting device and of the further closing and disconnecting device for further interrupting on both sides the electric circuit between battery and inverter.

BRIEF DESCRIPTION OF THE DRAWINGS

Exemplary embodiments of the disclosure are explained in greater detail with reference to the drawings and the following description.

DETAILED DESCRIPTION

Development-accompanying tests on battery systems for generating AC voltage such as, for example, lithium-ion batteries having an inverter with power switches arranged in series on parallel current branches revealed that in battery systems which initially caused no problems after mechanical tests despite severe mechanical force actions on the batteries during the test, cases repeatedly occurred in which the initially inconspicuous battery systems caught fire weeks after the mechanical tests.

The exemplary embodiments of the present disclosure as described in greater detail below allow battery cells to be transferred to a safe state by controlled discharge after an accident or in the event of serious technical problems, such as, for example, imminent overcharging of the battery cells by a charger not functioning properly. Even in the case of the battery remaining in this safe state for a relatively long time, this cannot lead to a fire. The battery cells are discharged here to an extent such that, for example, internal short circuits can no longer lead to the cells catching fire.

Figure 4:
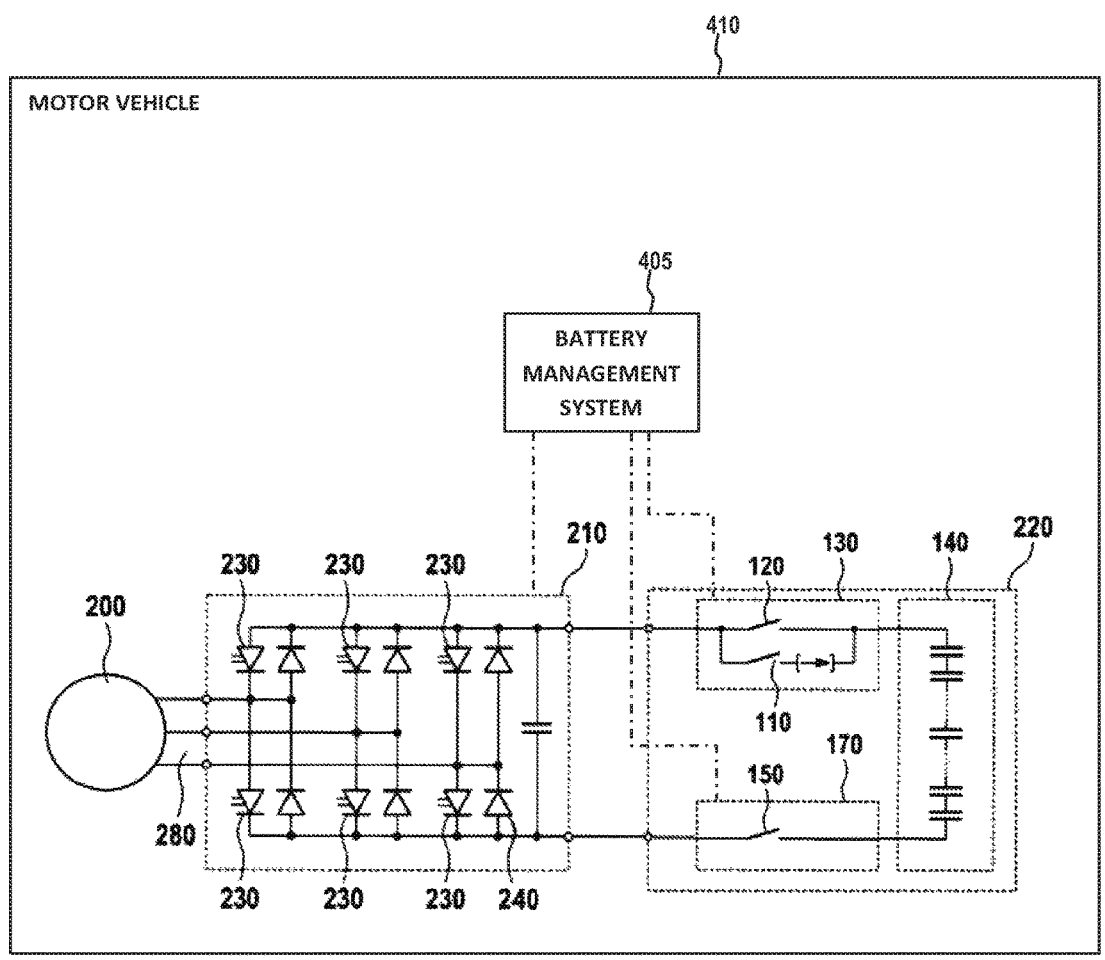
FIG. 4 shows a basic circuit diagram of a battery system according to the disclosure

An exemplary battery system according to the disclosure is shown in FIG. 4. The battery system includes a battery management system 405. In one embodiment, the battery system is and is included in a motor vehicle 410.

Figure 3:
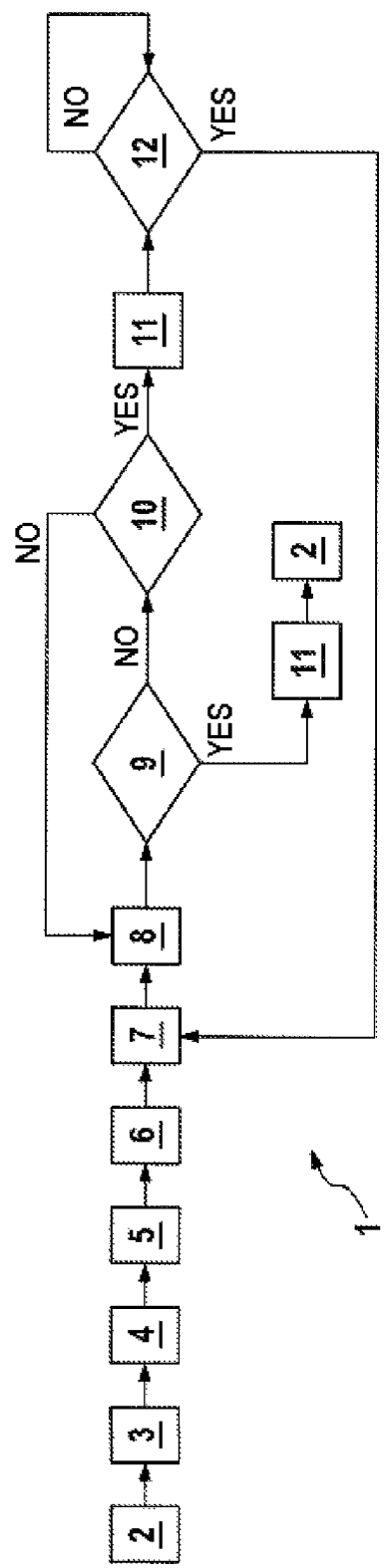
FIG. 3 shows a basic circuit diagram of an exemplary embodiment of the method according to the disclosure.

One exemplary embodiment of the method 1, shown in FIG. 3, according to the disclosure provides for carrying out, immediately after identifying an accident or a serious technical problem by means of a battery management system 405, a disconnection 2 of the battery 220 by means of the opening of the disconnecting switches, the disconnection of the battery 220 being at least a one-pole disconnection but preferably a two-pole disconnection.

In the exemplary embodiment with two-pole disconnection, after the two-pole disconnection the battery management system 405 firstly carries out an insulation resistance check by measuring 3 an insulation resistance value and comparing 4 it with a limit value with disconnecting switches 120, 130 and 110 open. This involves checking whether the high-voltage circuit of the battery 220 still has a sufficient electrical insulation resistance relative to ground. If the insulation resistance does not fall below a defined limit value, an insulation resistance check is carried out in a corresponding manner at the inverter.

The insulation resistance check at the inverter 210 can be effected for example by an inverter electronic unit which the inverter 210 comprises in the exemplary embodiment. In this case, the inverter electronic unit can communicate with the battery management system 405, that is to say receive control commands and send status reports, via a bidirectional communication interface realized as a CAN bus.

In the case of one-pole disconnection, an insulation resistance check can be carried out at the battery system. However, the presence of sufficient insulation relative to ground may also already have been ascertained by the battery management system 405 for other reasons and in some other way. The definite presence of sufficient insulation is sufficient for the disclosure.

If it is definitely the case that battery 220 and inverter 210 are insulated from the vehicle ground to an extent such that the battery 220 is safely transferable to a discharged state, the transmission 5 of a command by the battery management system 405 via the communication interface of the inverter electronic unit for power switches 230 electrically connected in series in at least one parallel current branch in the inverter 210 should be controlled such that all the power switches 230 electrically connected in series in at least one of the parallel current branches are switched on. In one development of the exemplary embodiment, a command is transmitted for switching on all power switches 230 electrically connected in series in each case in all parallel current branches.

After all the power switches 230 that are to be turned on in accordance with the command have been switched on, the inverter 210 communicates this state to the battery management system 405 via the bidirectional communication interface.

If the battery system comprises a second disconnecting device 170, closing 6 of the disconnecting switches 150 of said disconnecting device 170 is effected first of all. Afterward, closing 7 of the electric circuit is effected by the charging current source 110 of the charging and disconnecting device 130 of the battery system being turned on. This leads to discharging 8 of the battery via the charging current source 110. Since all power switches in a current branch of the inverter 210 are closed, no power is made available at the output of the inverter. In an electric or hybrid motor 200 of a motor vehicle that is connected to such a battery system, no torque is then generated during the discharging.

The charging current source 110 has to be designed for the current intensities that occur during the discharging. Alternatively, the battery management system 405 can carry out a check 10 during the discharging at the charging current source 110 to determine whether there is an imminent overloading of the current source 110. If the answer is yes, the charging current source 110 is switched off 11. In this case, an overloading can be identified by the battery management system 405 based on a model of the current source 110. After a check 12 has revealed that the charging current source 110 has recovered from the overloading on account of the switch-off and is again ready to discharge the battery cells 140, it is switched on again 7 by the battery management system 405 and a discharging 8 of the battery 220 is continued.

Whether continuously or with interruptions, the cells 140 of the battery system are in this way discharged to an extent such that an uncontrolled internal or external short circuit occurring later can no longer lead to a hazard.

After ascertaining 9 that the battery 220 is sufficiently discharged, the battery 220 can again be disconnected from the inverter 210 in a two-pole manner by the opening 11 of the disconnecting switches 120 and 150 and the simultaneous disconnection 2 of the charging current source 110.

In principle, it is expedient to transfer the battery cells 140 to a discharged state in the event of technical problems. As an example, mention shall be made of a charging process for a battery 220 in an electric vehicle in which the charger, on account of a fault, does not reduce the charging current even though the battery 220 is fully charged.

In this case, the battery 220 would be discharged in the manner described after the charger has been switched off by means of an electromechanical switch.

Figure 1:
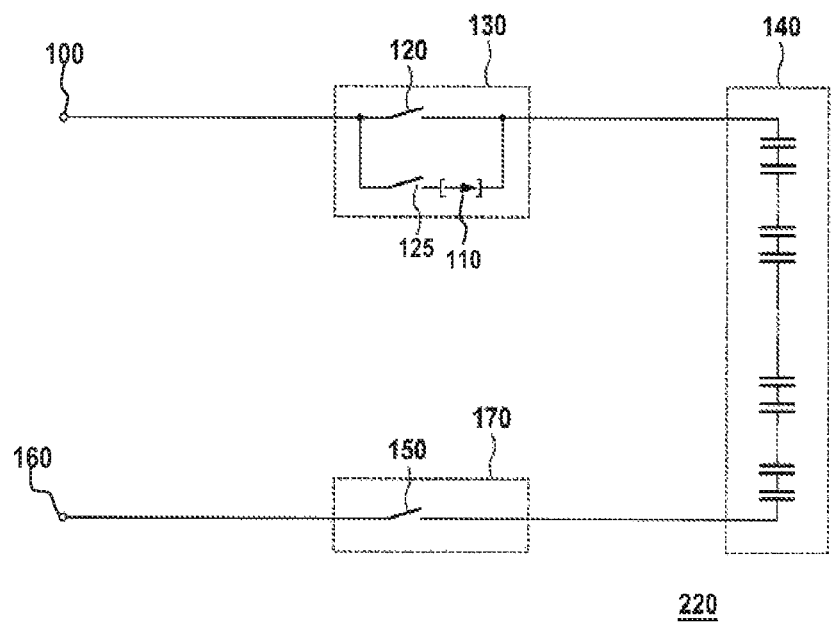
FIG. 1 shows a basic circuit diagram of a battery system according to the prior art.
Figure 2:
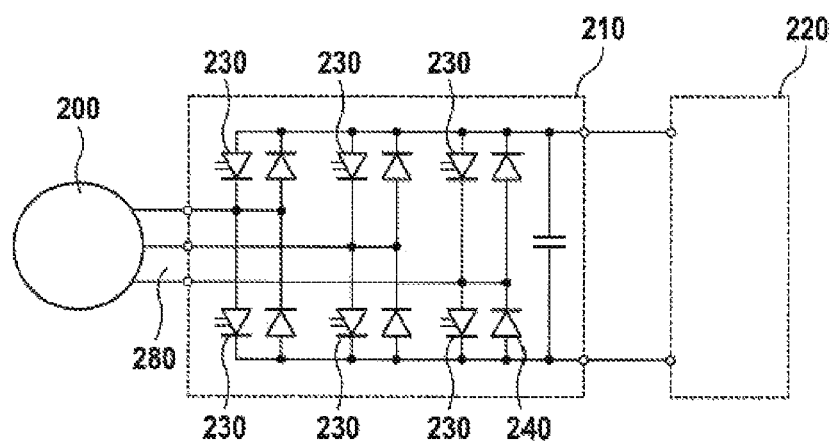
FIG. 2 shows a basic circuit diagram of a drive system according to the prior art.

Upon activation of said charging current source 110 by switch-on, the intermediate circuit capacitor—illustrated by way of example in FIG. 2—of a DC voltage intermediate circuit via which the traction battery 220 is connected to the DC voltage side of the inverter 210 can be charged to an extent such that compensation currents in the event of the closing of the disconnection switch 150 of the charging and disconnecting device 170 are limited to permissible values.

In a charging current source 110, the charging process for the intermediate circuit capacitor experiences a constant charging current. The rise in the capacitor voltage per unit time is thus linear and thus leads to complete charging more rapidly than asymptotically.

What is claimed is:

1. A method for discharging a battery included in a battery system, the battery system further including (i) an inverter including a plurality of parallel current branches, each current branch including a plurality of series-connected power switches, and (ii) a first charging and disconnecting device including a first current path having a first switch located between the battery and controllable inverter, the first switch being configured to selectively connect a first terminal of the battery to the controllable inverter, the method comprising:

measuring an insulation resistance value of the battery system;

ascertaining that the measured insulation resistance value does not fall below a minimum resistance value;

after the ascertaining, controlling the inverter to switch on the series-connected power switches in at least one current branch of the plurality of parallel current branches, such that the series-connected power switches in the at least one current branch are switched on simultaneously; and after the controlling of the inverter, controlling the first switch of the first charging and disconnecting device to connect the battery to the inverter and establish a discharge current that flows from the battery through the series-connected power switches in the at least one current branch that are switched on simultaneously.

2. A battery system for generating an AC voltage comprising:

a battery;

an inverter including a plurality of parallel current branches, each current branch including a plurality of series-connected power switches;

a first charging and disconnecting device including a first current path having a first switch located between the battery and the inverter, the first switch being configured to selectively connect the a first terminal of the battery to the inverter; and a battery management system operably connected to control the inverter and to control the first charging and disconnecting device, the battery management system being configured to:

control the inverter to switch on the series-connected power switches in at least one current branch of the plurality of parallel current branches, such that the series-connected power switches in the at least one current branch are switched on simultaneously; and control the first switch of the first charging and disconnecting device to connect the battery to the inverter and establish a discharge current that flows from the battery through the series-connected power switches in the at least one current branch that are switched on simultaneously.

3. The battery system according to claim 2, further comprising:

a second charging and disconnecting device that is controllable by the battery management system, the second charging and disconnecting device having a second current path having a second switch located between the battery and the inverter, the second switch being configured to selectively connect a second terminal of the battery to the inverter, wherein the battery management system is further configured to:

control the second switch of the second charging and disconnecting device to connect the battery to the inverter and establish the discharge current that flows from the battery through the series-connected power switches in the at least one current branch that are switched on simultaneously.

4. The battery system according to claim 2, wherein the battery management system is configured to, periodically control the first switch to interrupt the established discharge current.

5. The battery system according to claim 2, wherein the battery management system is configured to determine a presence of an imminent overloading of the first switch based on a model of the first switch.

6. The battery system according to claim 2, wherein the first charging and disconnecting device includes a component configured to limit the established discharge current to a predetermined threshold.

7. The battery system according to claim 2, wherein:

the battery system is included in a motor vehicle;

the motor vehicle further includes a machine suitable for generating torque;

the battery system is configured to supply the machine with electrical energy; and the plurality of parallel current branches includes at least three parallel current branches.

8. An inverter for a battery system, the battery system including a battery and the battery system being configured to generate an AC voltage with the battery, the inverter comprising:

a plurality of parallel current branches, each parallel current branch having a plurality of series-connected power switches that are switchable by external control of the inverter, wherein the inverter is configured for external control, and wherein in response to the external control the battery is connected to the inverter and the series-connected power switches of the plurality of series-connected power switches in at least one of the parallel current branches are switched on simultaneously to establish a discharge current that flows from the battery through the series-connected power switches in the at least one current branch that are switched on simultaneously.

* * * * *